| United States Patent [19] | [11] 4,121,026 |
|---|---|
| Cheng et al. | [45] Oct. 17, 1978 |

[54] COPOLYMERS OF ALPHA-OLEFINS AND MALEIC ANHYDRIDE REACTED WITH AMINES IN THE PRESENCE OF LEWIS ACIDS

[75] Inventors: William J. Cheng; David B. Guthrie, both of St. Louis, Mo.

[73] Assignee: Petrolite Corporation, St. Louis, Mo.

[21] Appl. No.: 344,420

[22] Filed: Mar. 23, 1973

[51] Int. Cl.$^2$ .......................... C08F 8/32; C08F 8/44; C08F 22/06
[52] U.S. Cl. .................................. 526/15; 526/522; 526/12; 526/272; 44/71; 260/DIG. 19; 260/DIG. 20; 260/DIG. 21; 526/473
[58] Field of Search ................. 260/78.5 T, 78.5 CA, 260/78.5 SL, 78 UA, DIG. 20, DIG. 19, DIG. 21; 526/15, 49, 272

[56] References Cited

U.S. PATENT DOCUMENTS

| 2,456,177 | 12/1948 | Cupery | 260/78 UA |
| 2,698,316 | 12/1954 | Giammaria | 260/78.5 T |
| 3,684,777 | 8/1972 | Field et al. | 260/78.5 T |

*Primary Examiner*—Joseph L. Schofer
*Assistant Examiner*—Maria S. Tungol
*Attorney, Agent, or Firm*—Sidney B. Ring; Hyman F. Glass

[57] ABSTRACT

This invention relates to copolymers of alpha-olefins and maleic anhydride reacted with amines in the presence of Lewis acids, preferably $BF_3$ or a complex thereof; and to the use of these products as anti-static agents in organic liquids, preferably in hydrocarbons. The use of Lewis acid produces a unique reaction product which is superior as to fluidity and/or anti-static properties as compared to the corresponding product produced without Lewis acid. In addition, the use of Lewis acid promotes the rate of reaction thus reducing reaction time.

10 Claims, No Drawings

COPOLYMERS OF ALPHA-OLEFINS AND MALEIC ANHYDRIDE REACTED WITH AMINES IN THE PRESENCE OF LEWIS ACIDS

This invention relates to organic liquids having desirable anti-static properties, and, in one of its aspects, relates more particularly to organic liquid compositions in the form of volatile organic liquids such as hydrocarbon fuels or solvents which possess low electrical conductivity which, when they accumulate electrostatic charges, may give rise to the hazards of ignition or explosion. Still more particularly in this aspect, the invention relates to the improvement of such organic liquids by incorporating therein, additives which are effective in increasing the electrical conductivity of such liquids to the extent that accumulation of electrostatic charges with attendant danger of ignition or explosion, is significantly minimized, particularly in the handling, transportation or treatment of such liquids.

The low electrical conductivity of many volatile organic liquid compositions has presented the problem of controlling static buildup, particularly during handling and transportation, for the purpose of insuring safe and effective distribution without the concomitant danger of ignition or explosion. For example, volatile organic liquids such as hydrocarbon fuels (e.g. gasoline, jet fuels, turbine fuels and the like), or light hydrocarbon oils employed for such purposes as solvents or cleaning fluids for textiles, possess a very low degree of electrical conductivity. In the use of such fluids, electrostatic charges, which may be generated by handling, operation or other means, tend to form on the surface, and may result in sparks, thus resulting in ignition or explosion. These hazards may be encountered merely in the handling or transportation of such organic liquids and even in operations, such as centrifuging, in which a solid is separated from a volatile liquid, during which electrostatic charges can accumulate.

Various materials have heretofore been proposed for incorporation into such organic liquid compositions for increasing their electrical conductivity and thus reduce the aforementioned dangers of ignition and explosion. Such materials, however, have not been proved to be sufficiently effective in increasing the desired electrical conductivity of these fluids and, in many instances, have been found to be too costly for the relatively small degree of increased protection which they are capable of providing.

In accordance with the present invention, improved liquid hydrocarbon compositions are provided containing, in an amount sufficient to impart anti-static properties, the Lewis acid reaction product of an amine derivative of an olefin/maleic anhydride copolymer. The incorporation of this anti-static agent in the liquid composition, imparts increased electrical conductivity to an extent greater than that which has heretofore been realized with many other anti-static materials.

In general, the present invention, in its preferred applications, contemplates organic liquid compositions which normally are capable of accumulating a relatively large degree of electrostatic charge resulting in the aforementioned hazards of ignition and explosion, having incorporated therein a small amount of the aforementioned reaction product, usually from about 0.1 to about 200, and preferably from about 1 to about 10 pounds, per thousand barrels of the total volume of the liquid composition. This is equivalent to about 0.33 to 660 ppm and preferably from about 1.0 to 33 ppm.

A field of specific applicability of the present invention is the improvement of organic liquid compositions in the form of petroleum distillate fuel oils having an initial boiling point from about 75° F. to about 135° F. and an end boiling point from about 250° F. to about 1000° F. It should be noted, in this respect, that the term "distillate fuel oils" is not intended to be restricted to straight-run distillate fractions. These distillate fuel oils can be straight-run distillate fuel oils, catalytically or thermally cracked (including hydrocracked) distillate fuel oils, or mixtures of straight-run distillate fuel oils, naphthas and the like, with cracked distillate stocks. Moreover, such fuel oils can be treated in accordance with well-known commercial methods, such as acid or caustic treatment, hydrogenation, solvent refining, clay treatment, and the like.

The distillate fuel oils are characterized by their relatively low viscosity, pour point and the like. The principal property which characterizes these contemplated hydrocarbons, however, is their distillation range. As hereinbefore indicated, this range will lie between about 75° F. and about 1000° F. Obviously, the distillation range of each individual fuel oil will cover a narrower boiling range, falling nevertheless, within the above-specified limits. Likewise, each fuel oil will boil substantially, continuously, throughout its distillation range.

Particularly contemplated among the fuels are Nos. 1, 2 and 3 fuel oils, used in heating and as diesel fuel oils, gasoline, turbine fuels and the jet combustion fuels, as previously indicated. The domestic fuel oils generally conform to the specifications set forth in ASTM Specification D396-48T. Specifications for diesel fuels are defined in ASTM Specification D975-48T. Typical jet fuels are defined in Military Specification MIL-F-5624B.

Other fields of specific applicability of the present invention are: solvents, as used with paints; spot removers such as naphtha cleaners; textile compositions; pigments; liquid polishes; rubber compositions and the like. In brief, the anti-static agents of this invention can be used with a composition susceptible of accumulating a static electrical charge or a composition susceptible of generation of such a charge. Thus, a static electrical charge accumulated by such a composition with one or more of the novel anti-static agents. For example, a fabric or fibre can be surface treated with one or more of the agents, to reduce the susceptibility of fibre or fabric to accumulated static charge.

When a copolymer derived from an α-olefin and maleic anhydride is reacted with an amine, one may obtain, the amine salt, the amic acid, the amine salt of the amic acid, etc., or mixtures thereof, for example, according to the following idealized equation:

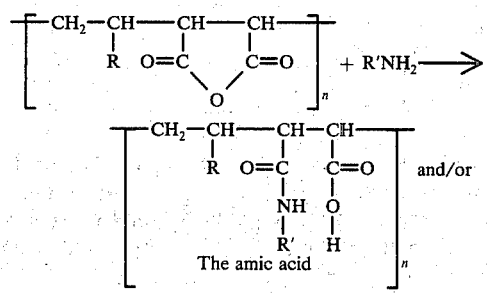

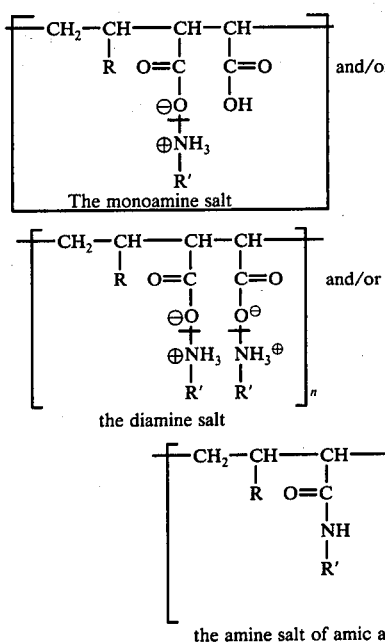

the monoamine salt the diamine salt the amine salt of amic acid

We have now discovered that this reaction, when carried out in the presence of a Lewis acid, proceeds at a faster rate and produces a unique product which is more fluid in solution and more effective as an antistatic agent.

In general, the copolymer is prepared by reacting an α-olefin with maleic anhydride in essentially equimolar ratios. These copolymers are well known and methods for preparing them are described in U.S. Pat. Nos. 2,527,081 and 2,542,542.

A wide variety of α-olefins can be employed in preparing the α-olefin-maleic anhydride copolymer. Representing the α-olefin is the following idealized formula,

where R is a hydrocarbon group such as an alkyl group, $H(CH_2)_{\overline{n}}$ where $n$ is a number such as from about 0–50, for example from about 4–24, but preferably from about 6–20, with an optimum of about 10–18.

The time for reaction of the copolymer with the amine may depend on various factors such as temperature, reactants, etc., and may vary such as from about 0.1 to 100 hours or more, such as from about 0.25 to 48 hours, for example from about 0.5 to 24 hours, but preferably from about 1 to 12 hours.

The reaction temperature of the copolymer with the amine can vary depending on various factors such as the particular reactants, the time reacted, the Lewis acid employed, etc. In general the reaction is carried out at a temperature of about 0° to 170° C. such as from about 25° C. to 140° C., for example from about 70° C. to 125° C., but preferably from about 90° C. to 120° C.

The molar ratio of amine to maleic anhydride in the copolymer will depend on the desired product. Thus, one may employ from about 0.25 mole of amine to about 3 moles of amine per mole of maleic anhydride in the copolymer but preferably in the ratio of 1:1 to 2:1.

The amount of Lewis acid employed may depend on various factors such as the particular Lewis acid, the particular copolymer, the particular amine, etc., employed. Based on the weight of the copolymer, with Lewis acids such as $BF_3$, one may employ from about 0.01 to 300 mole%, such as from about 0.1 to 200 mole%, for example from about 0.5 to 150 mole%, but preferably from about 1 to 100 mole% with an optimum of about 40 to 60 mole%.

The amines utilizable in forming the amic acids and salts thereof are the primary and secondary aliphatic amines having between about 4 and about 30 carbon atoms per molecule or mixtures thereof. These are monoamines having one, or two open chain hydrocarbon groups attached to a nitrogen atom. The aliphatic radical can be saturated or unsaturated, and branched-chain or normal chain. Likewise mixtures of these amines, as well as pure amines, can be employed. A very useful and readily available class of primary amines are the tertiary-alkyl and secondary-alkyl primary, monoamines in which a primary amino (—$NH_2$) group is attached to a tertiary carbon atom or secondary carbon atom, respectively; and to mixtures thereof. These amines contain the respective terminal groups:

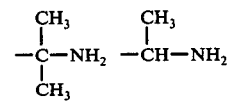

Non-limiting examples of the amine reactants are t-butyl primary amine, t-hexyl primary amine, n-hexylamine, n-octylamine, n-octenylamine, t-octyl primary amine, 2-ethylhexylamine, di-n-butyl amine, t-decyl primary amine, n-decylamine, isodecylamine, t-dodecyl primary amine, n-undecylamine, dodecenylamine, dodecadienylamine, tetradecylamine, t-tetradecyl primary amine, t-octadecyl primary amine, hexadecylamine, octadecenylamine, octadecadienyl amine, t-eicosyl primary amine, t-docosyl primary amine, t-tetracosyl primary amine, and t-triacontyl primary amine. The amino reactants can be prepared in several ways well known to those skilled in the art. Specific methods of preparing the t-alkyl primary amines are disclosed in the Journal of Organic Chemistry, vol. 20, page 295 et seq. (1955). Mixtures of such amines can be made from a polyolefin fraction (e.g., polypropylene and polybutylene cuts) by first hydrating with sulfuric acid and water to the corresponding alcohol converting the alcohol to alkyl chloride with dry hydrogen chloride, and finally condensing the chloride with dry hydrogen chloride, and finally condensing the chloride with ammonia, under pressure, to produce a t-alkyl primary amine mixture.

Once the amic acid is formed, salts thereof may be formed from other than primary and secondary amines, for example from tertiary amines such as tributyl amine, trihexyl amine, etc.

The tertiary alkyl primary monoamines may be summarized by the following general formula:

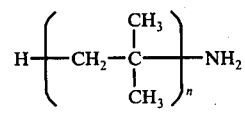

where $n$ is 1–5 but preferably 1–3. A commercial product representing this type is Primene 81-R (also referred to as Pr 81-R) and is a mixture of isomeric amines in the $C_{12-14}$ range, i.e., where $n = 3 - 4$.

The process of this invention produces a unique product. For example, when the reaction is carried out without the Lewis acid, and the product is diluted to a concentration of 50% by weight in a hydrocarbon solvent (a convenient concentration for selling the additive), a gel is obtained. However, when Lewis acid is employed, and the product is diluted to the same (50%) concentration, a fluid solution is obtained.

Besides improved fluidity, the anti-static property of the product is superior to that obtained without the Lewis acid.

A suitable commercial product should be formulated at 33 or 50% solution and should impart as high a conductivity as possible in the organic liquid to be treated preferably a conductivity of at least 2000 picomhos/meter at a concentration of 100 ppm.

Lewis acids include the acid-acting halides of the elements aluminum, boron, iron, tin, antimony, arsenic, bismuth, molybdenum, tungsten, vanadium, zinc, titanium, thorium, cerium, zirconium, indium, thalium and the like. Boron fluoride, aluminum chloride, aluminum bromide, zinc chloride, ferric chloride and ferric bromide are particularly suitable catalysts of this group. A valuable subgroup of catalysts comprises the above-described and the like acid-acting halides in combination to form a complex catalyst with an inorganic or organic compound possessing a dipole moment. Such a complex catalyst may comprise an acid-acting metal halide or boron halide in combination with an inorganic acid-acting halide of another species, with a hydrogen halide, or with an inorganic neutral-acting metal halide such as the alkali metal halides, the alkaline earth metal halides, the halides of metals as nickel, silver, cobalt and the like. On the other hand such a complex catalyst may comprise an acid-acting metal halide or boron halide in combination as a complex with an organic oxy-compound possessing a dipole moment such as the organic nitro-compounds of which the nitro-paraffins, the nitro-aralkyl compounds, and the nitro-cyclohexane and the like and their homologues and substitution products are representative; such as the ketones of aliphatic, aralkyl, aromatic or mixed character of which acetone, methyl ethyl ketone, methyl propyl ketone, acetophenone, ethyl phenyl ketone, benzophenone and the like and their homologues and substitution products are representative; such as the aliphatic, aralkyl or aromatic carboxylic acid halides, particularly the aromatic carboxylic acid halides as benzoyl chloride, benzoyl bromide, etc., and their homologues and suitable substitution products; such as the organic sulphones, particularly the aryl and aralkyl sulphones as diphenyl sulphone, benzyl sulphone, and their homologues and suitable substitution products; and other organic compounds possessing a dipole moment and capable of combining with a boron halide or acid-acting metal halide to form a complex.

Condensation catalysts comprising an aluminum halide such as $AlCl_3$, $AlBr_3$, $AlCl_3$—NaCl, $AlCl_3$—$BaCl_2$, $AlBr_3$—KCl, $AlCl_3$—AgCl, $AlF_3$—NaCl, $AlBr_3$—AgBr, $AlBr_3$—$BaBr_2$, $AlCl_3$—nitromethane, $AlCl_3$—nitrobenzene, $AlCl_3$—nitrobenzene—NaCl, $AlCl_3$—acetone, $AlCl_3$—acetophenone, $AlCl_3$—benzophenone, $AlCl_3$—benzoyl chloride, $AlCl_3$—diphenyl sulphone, $AlCl_3$—dibenzyl sulphone and the like may be advantageously employed. Another subgroup embraces those comprising a boron halide such as $BF_3$, $BCl_3$, $BF_3$—HF, $BF_3$—NaCl, $BCl_3$—NaCl, $BF_3$—AgF, $BF_3$—$BaCl_2$, $BF_2$—nitromethane, $BF_3$—nitrobenzene and the like.

The preferred Lewis acid is $BF_3$, preferably in the form of a complex such as the etherate.

The following examples are presented for purposes of illustration and not of limitation.

The compositions of this invention are prepared from (A) commercially available alpha-olefin/maleic anhydride copolymers (e.g., Gulf Polyanhydride PA-14, PA-8, PA-10, PA-12, PA-16, PA-18) and (B) in situ prepared copolymers prepared fromm tetradecene-1 and decene-1/maleic anhydride copolymers. The number in the Polyanhydride indicates the carbon length of the olefin. Thus PA-14 is a copolymer of a $C_{14}$ alpha-olefin and maleic anhydride.

The preparations of those compositions in Group A which describe the invention are found in Examples II and III which follow:

EXAMPLE I (without Lewis acid)

The Polyanhydride (PA-14, 78g) is charged to a vessel and is dissolved in aromatic solvent at 100°–110° C. The amine (Primene 81-R, 107.4g) is charged rapidly with stirring while maintaining the reaction temperature at 100°–110° C. with stirring continuing at 100°–110° C. for 24 hours. The resulting product is the anti-static agent formulated at 25% concentration and possesses highly viscous flow. The conductivity units for the product at 100 ppm in fuel oil is 1960 picomhos/meter.

EXAMPLE II (with Lewis acid)

The Polyanhydride (PA-14, 78g) is charged to a vessel and is dissolved in aromatic solvent at 100°–110° C. The Lewis acid ($BF_3$ etherate at 47% $BF_3$, 1.6g) is charged followed by the amine (Primene 81-R, 107.4g) with stirring at 100°–110° C. The reaction mass is stirred for six hours while maintaining the temperature at 100°–110° C. The resulting product is the anti-static agent formulated at 25% concentration and is fluid. The conductivity units for the product at 100 ppm in fuel oil is 1960 picomhos/meter.

EXAMPLE III (with Lewis acid)

The Polyanhydride (PA-14, 78g) is charged to a vessel and is dissolved in aromatic solvent at 100°–110° C. The Lewis acid ($BF_3$ etherate at 47% $BF_3$, 8.0g) is charged followed by the amine (Primene 81-R, 107.4g) with stirring at 100°–110° C. The reaction mass is stirred for six hours at 100°–110° C. The resulting product is the anti-static agent formulated at 25% concentration and is very fluid. The conductivity units for the product at 100 ppm in fuel oil is 2225 picomhos/meter.

Table I summarizes preparations of Group A anti-static agents made according to the procedures of Examples I, II, and III. In every case, the use of a Lewis acid improved the fluidity and/or the anti-static activity and/or reduces reaction time.

Inspection of Example 1 (parts a, b, c, d) shows that when the Lewis acid $BF_3$ is employed at only about 1% by weight of the polyanhydride PA-14, two effects are clearly observed: one, the reaction time is shortened by more than 50%; and two, the product fluidity is greatly improved. At this use level of Lewis acid there is no apparent improvement in the anti-static activity as measured in conductivity units.

Inspection of Example 2 (parts a, b, c) shows that not only are the same two effects observed again but that the anti-static activity is improved by about 18% when the amount of Lewis acid $BF_3$ is increased to about 5% by weight of the polyanhydride PA-14.

Inspection of Example 3 (parts a, b, c) shows that both fluidity and anti-static activity are improved when Lewis Acid $BF_3$ is used and that fluidity is improved when Lewis Acid $FeCl_3$ is used.

Inspection of Example 4 (parts a, b, c) shows that both improved fluidity and improved anti-static activity are again demonstrated by the use of Lewis acids other than $BF_3$ such as $FeCl_3$ and $TiCl_4$. The successful use of isodecylamine is also observed.

Inspection of Example 5 (parts a, b) shows that improved fluidity of the anti-static agent is observed when the Lewis acid $BF_3$ is used with the polyanhydride PA-10 which is derived from a $C_{10}$ alpha-olefin and maleic anhydride.

Inspection of Example 6 (parts a, b) shows that improved fluidity of the anti-static agent without loss of anti-static activity is observed when the Lewis acid $BF_3$ is used with the polyanhydride PA-18 which is derived from a $C_{18}$ alpha-olefin and maleic anhydride.

Inspection of Example 7 (parts a, b) shows that improved fluidity and improved activity of the anti-static agent are observed when the Lewis acid $BF_3$ is used in the reaction mixture when the amount of Primene 81-R has been reduced by 50%.

Inspection of Example 8 (parts a, b) shows that both improved fluidity and improved activity of the anti-static agent is observed when the Lewis acid $BF_3$ is used in the reaction mixture when the amine is di-n-butylamine.

Inspection of Example 9 (parts a, b) shows that Lewis acid $BF_3$ enhances anti-static activity where the amine employed in the reaction mixture is a higher amine such as Primene JM-T (an alkyl primary amine having about 18–22 carbon atoms, i.e., where n = about 5.

The preparation of those compositions in Group B which describe the invention are found in Example V which follows:

EXAMPLE IV (without Lewis acid)

To a polymerization reactor are charged tetradecene-1 (196g), maleic anhydride (98g) and aromatic solvent (50g). The contents are heated to 130°–150° C. and 0.8g di-t-butyl peroxide is added. The reaction temperature is controlled at 130°–160° C. for 12 hours. The polymer is diluted with aromatic solvent to 50%. The amine (Primene 81-R, 404g) is added at 75°–80° C. and is stirred for six hours at 100°–110° C. The product is diluted to the desired concentration with aromatic solvent. The measure of anti-static activity is conductivity units at 100 ppm in fuel oil is 1910 picomhos/meter.

EXAMPLE V (with Lewis acid)

The polymer solution of Example IV (26.4g) and 51g of aromatic solvent is charged to a reactor and heated at 100° C. until homogeneous. The Lewis acid ($BF_3$ etherate at 47% $BF_3$, 1.3g) is charged. The amine (Primene 81-R, 18.2g) is added at 87°–106° C. The resulting solution is stirred at 100°–110° C. for 6 hours. The product is diluted to the desired concentration with aromatic solvent. The measure of anti-static activity in conductivity units at 100 ppm in fuel oil is 2315 picomhos/meter.

Table II summarizes the preparations of Group B anti-static agents made according to the procedures of Examples IV and V. In each of the three examples, it is clearly apparent that the use of Lewis acid improved the fluidity and/or anti-static activity when polyanhydride solutions, derived from α-olefins and maleic anhydride and used directly after polymerization, were allowed to react with the appropriate amine.

The test to screen agents having anti-static activity as measured in conductivity units is performed according to the following procedure:

A solution of the anti-static agent in fuel oil is placed in a meticulously clean container in which a Balsbaugh cell is immersed. A one-volt potential is supplied from a Kepco Lab voltage source. The amperage is measured on a 602A Keithley electrometer. The fuels are tested in a 25° C. constant temperature bath. The conductivity units in picomhos/meter are calculated from the following equations and data:

$$E = IR; \ L = k/R; \ L = KI/E.$$

$I$ = Amperage read from Keithley
$E$ = Voltage = 1 Volt
$k$ = cell constant = 0.89 × 10 inches
$L$ = Conductivity units in picomhos/meter

TABLE I
SUMMARY OF GROUP A ANTISTATIC AGENTS

| Example | Procedure of Example | Polyanhydride Type | Polyanhydride Amount | Amine Type | Amine Amount | Lewis Acid* Type | Lewis Acid* Calc. Amount | Reaction Time Hours | Fluidity At 25% Concentration | Antistatic Activity Conductivity Units in Fuel Oil At 100 PPM Picomhos Meter |
|---|---|---|---|---|---|---|---|---|---|---|
| 1 a | I | PA-14 | 78g | Pr-81R | 107.4g | — | — | 25 | Viscous | 1960 |
| b | I | PA-14 | 78g | Pr-81R | 107.4g | — | — | 14 | Viscous | 1960 |
| c | II | PA-14 | 78g | Pr-81R | 107.4g | $BF_3$ | .75g | 6 | Fluid | 1960 |
| d | II | PA-14 | 78g | Pr-81R | 107.4g | $BF_3$ | .75g | 6 | Fluid | 1960 |
| 2 a | I | PA-14 | 78g | Pr-81R | 111.4g | — | — | 12 | Viscous | 1870 |
| b | II | PA-14 | 78g | Pr-81R | 111.4g | $BF_3$ | .75g | 6 | Fluid | 1780 |
| c | III | PA-14 | 78g | Pr-81R | 107.4g | $BF_3$ | 3.76g | 6 | Fluid | 2225 |
| 3 a | I | PA-14 | 6.5g | Pr-81R | 9.0g | — | — | 6 | Viscous | 2320 |
| b | III | PA-14 | 6.5g | Pr-81R | 9.0g | $BF_3$ | .37g | 6 | Fluid | 2660 |
| c | III | PA-14 | 6.5g | Pr-81R | 9.0g | $FeCl_3$ | .7g | 6 | Fluid | 2350 |
| 4 a | I | PA-14 | 6.5g | isodecyl | 7.0g | — | — | 69 | Gel | 620 |
| b | II | PA-14 | 6.5g | isodecyl | 7.0g | $FeCl_3$ | .7g | 69 | Fluid | 2490 |
| c | III | PA-14 | 6.5g | isodecyl | 7.0g | $TiCl_4$ | .9g | 69 | Fluid | 2350 |
| 5 a | I | PA-10 | 5.5g | Pr-81R | 9.0g | — | — | 6 | Gel | — |
| b | III | PA-10 | 5.5g | Pr-81R | 9.0g | $BF_3$ | .33g | 6 | Fluid | 1425 |
| 6 a | I | PA-18 | 7.8g | Pr-81R | 9.0g | — | — | 6 | Gel | — |
| b | III | PA-18 | 7.8g | Pr-81R | 9.0g | $BF_3$ | .33g | 6 | Fluid | 2320 |
| 7 a | I | PA-14 | 6.5g | Pr-81R | 4.5g | — | — | 6 | Viscous | 1870 |
| b | III | PA-14 | 6.5g | Pr-81R | 4.5g | $BF_3$ | .14g | 6 | Fluid | 2140 |
| 8 a | I | PA-14 | 6.5g | di-n-butyl | 5.8g | — | — | 59 | Gel | 1335 |

TABLE I-continued
SUMMARY OF GROUP A ANTISTATIC AGENTS

| Example | Procedure of Example | Polyanhydride Type | Amount | Amine Type | Amount | Lewis Acid* Type | Calc. Amount | Reaction Time Hours | Fluidity At 25% Concentration | Antistatic Activity Conductivity Units in Fuel Oil At 100 PPM Picomhos Meter |
|---|---|---|---|---|---|---|---|---|---|---|
| b | III | PA-14 | 6.5g | di-n-butyl | 5.8g | BF₃ | .37g | 59 | Viscous | 1660 |
| 9 a | I | PA-14 | 6.5g | Pr-JM-T | 13.4g | — | — | 6 | Fluid | 2320 |
| b | III | PA-14 | 6.5g | Pr-JM-T | 13.4g | BF₃ | .28g | 6 | Fluid | 2490 |

*BF₃ etherate at 47% BF₃ content was actually employed; the amount indicated is the calculated amount of BF₃ introduced into the reaction mixture.

TABLE II
SUMMARY OF GROUP B ANTISTATIC AGENTS

| Example | Procedure Of Example | Olefin | Prep. Size | Polyanhydride Conc. | Amt. | Amine Type | Amt. | Lewis Acid Type | Amt. | Reaction Time | Product Concentration | Fluidity | Antistatic Activity Conductivity Units In Fuel Oil At 100 PPM Picomhos/meter |
|---|---|---|---|---|---|---|---|---|---|---|---|---|---|
| 10 a | IV | C₁₄ | 1 liter | 50% | 294g | PR-81R | 404g | — | — | 6 | 25% | Fluid | 1910 |
| b | V | C₁₄ | 1 liter | 50% | 13.2g | PR-81R | 18.2g | BF₃ | .6g | 6 | 33% | Fluid | 2315 |
| 11 a | IV | C₁₀ | 10-gal. | 30% | 100g | PR-81R | 110.2g | — | — | 6 | 47% | Viscous | 1850 |
| b | V | C₁₀ | 10-gal. | 30% | 100g | PR-81R | 110.2g | BF₃ | 5.0g | 6 | 47% | Fluid | 2140 |
| 12 a | IV | C₁₄ | 100-gal. | 30% | 100g | PR-81R | 110.6g | — | — | 6 | 33% | Viscous | 1960 |
| b | V | C₁₄ | 100-gal. | 30% | 100g | PR-81R | 110.0g | BF₃ | 5.0g | 6 | 44.4% | Fluid | 2220 |
| c | V | C₁₄ | 100-gal. | 30% | 100g | PR-81R | 110.0g | BF₃ | 10.0g | 6 | 44.4% | Fluid | 2750 |

*BF₃ etherate at 47% BF₃ content was actually employed; the amount indicated is the calculated amount of BF₃ introduced into the reaction mixture.

In general a minor amount of the anti-static agents of this invention is employed in the organic field. The amount will vary with the particular agent, the system, etc. In general, at least about 0.001 ppm are employed such as from about 0.1 to 1000 ppm, for example from about 0.5 to 500 ppm, but preferably from about 1.0 to 100 ppm with an optimum of about 1 to 10 ppm.

In summary, the present invention provides the following:

(1) Reduces time for reacting the copolymer with the amine.

(2) Yields a product which is more fluid in solution.

(3) Yields a product which has improved anti-static properties.

At low Lewis acid concentration, i.e., at about 4 to 6 mole%, but preferably about 6 to 10 mole% based on anhydride reaction time is reduced and viscosity lowered.

At higher Lewis acid concentrations, i.e., at about 15 to 100 mole%, but preferably 40 to 60 mole% based on anhydride, anti-static property is also enhanced.

The use of Lewis acid is particularly effective with lower "Primene" amines, particularly those of the formula

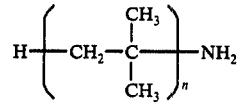

where $n$ is about 3–5, but preferably about 3.

We claim:

1. A process of reacting a copolymer of an alpha-olefin and maleic anhydride with a primary amine, a secondary amine or mixtures thereof in the presence of a Lewis acid, the molar ratio of amine to maleic anhydride in the copolymer being from about 0.25 to about 3.

2. The process of claim 1 where the amine is a primary amine, the amino group being attached to a secondary or tertiary carbon atom.

3. The process of claim 2 where the amino group is attached to a tertiary carbon.

4. The process of claim 3 where the Lewis acid is BF₃ or a complex thereof.

5. The process of claim 4 where the alpha-olefin is of the formula

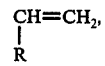

where R has 6–20 carbons.

6. The product of claim 1.
7. The product of claim 2.
8. The product of claim 3.
9. The product of claim 4.
10. The product of claim 5.

* * * * *